March 7, 1961 H. F. HORNER ET AL 2,973,614
ROTARY POWER MOWER AND CATCHER
Filed Nov. 21, 1958 2 Sheets-Sheet 1
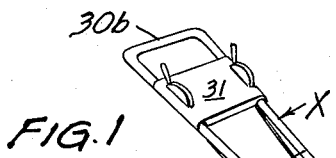
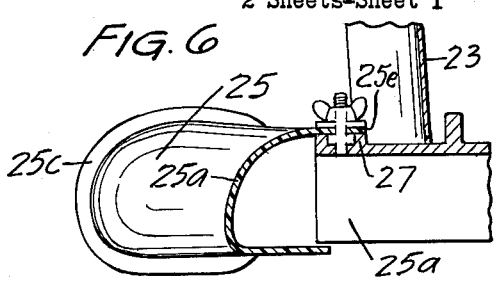
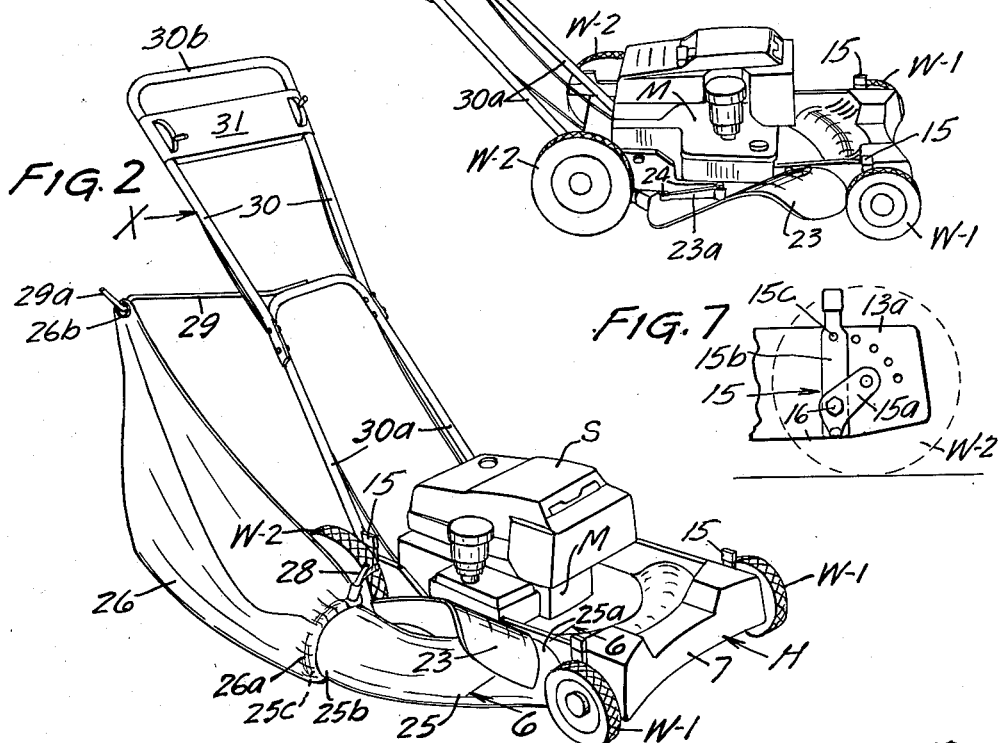
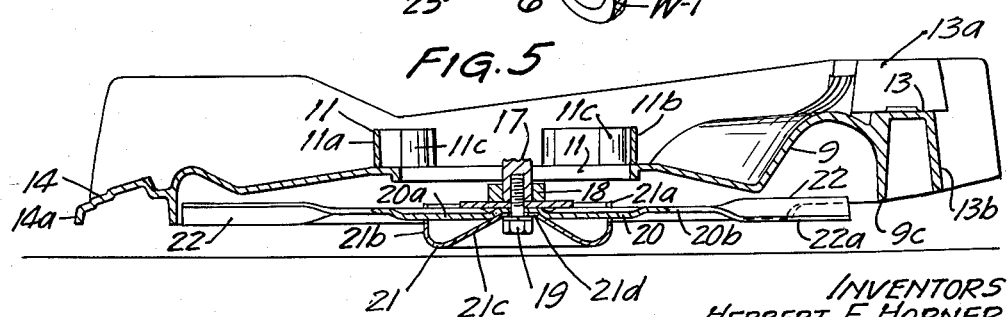
INVENTORS
HERBERT F. HORNER
DONALD O. BENSON
HARLEY E. KROLL
BY Williamson, Schroeder & Palmatier
ATTORNEYS

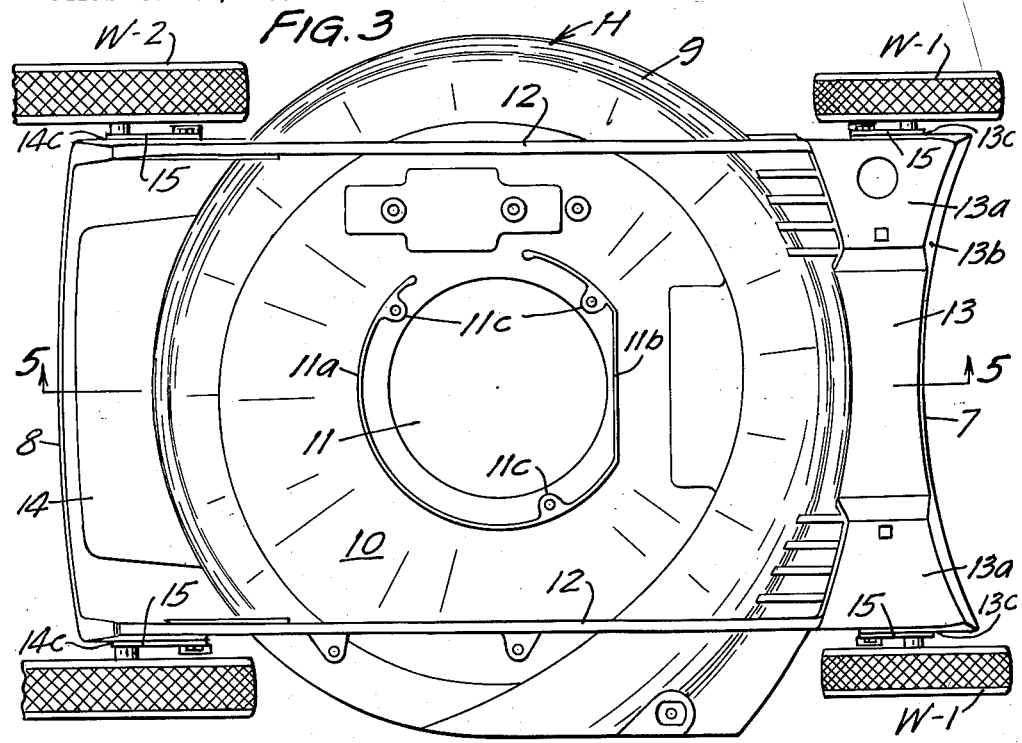
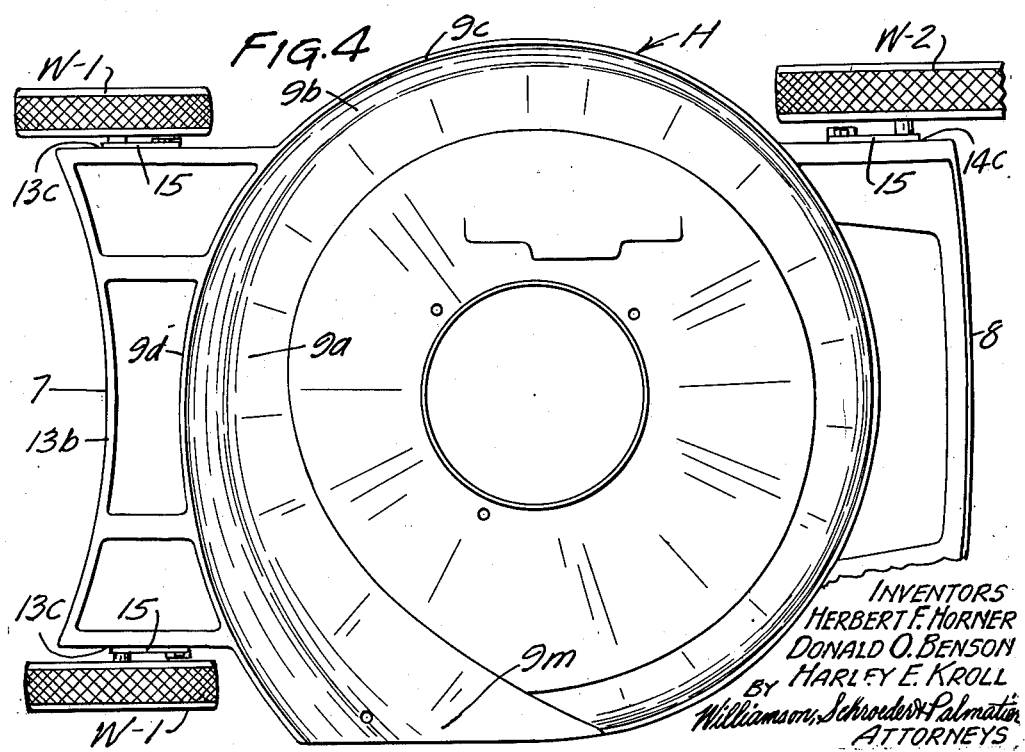

United States Patent Office 2,973,614
Patented Mar. 7, 1961

2,973,614

ROTARY POWER MOWER AND CATCHER

Herbert F. Horner, Minneapolis, Harley E. Kroll, Hopkins, and Donald O. Benson, Minneapolis, Minn., assignors to Toro Manufacturing Corporation, Minneapolis, Minn., a corporation of Minnesota Filed Nov. 21, 1958, Ser. No. 775,492

12 Claims. (Cl. 56—25.4)

This invention relates to rotary power mowers wherein rapidly revolving, generally horizontal cutter blades are employed in combination with an enclosing housing and wherein the revolution of said blades produces an updraft or suction principle of important assistance in cutting grass and weeds by sickle action.

Such rotary mowers are very extensively used at the present time and are preferred by many to reel-bed knife mowers since they will successfully cut very tall grass and weeds which cannot be cut with conventional reel-type lawn mowers. The current and prior art rotary mowers however, do not adequately provide for the widely variable lawn conditions which exist throughout the United States and foreign countries. Particularly, they are inadequate to efficiently cut thick grass and weeds where high capacity and very fast dispersion of the cuttings are essential. Furthermore, prior art rotary mowers, while making some provision for guarding the operator and bystanders from stones or small obstacles rapidly thrown by the revolving blades, are inadequate to fully protect the users and bystanders in many instances and often topple over due to the recoil from starting of the motor or in manipulating the mower on steep slopes, such occurrences frequently causing serious injury to the operator. Our present invention provides a substantially improved rotary mower of high capacity and efficiency which overcomes the objections to prior art mowers previously recited, and which substantially eliminates the danger of injury to operators or bystanders.

Our present invention employs a number of closely cooperating mechanisms and features which combine to give greater stability of the mower on slopes and in starting; to provide greater protection against accident to the operator or bystander and to provide for varying discharge conditions for dispersion and collection for various types of cuttings and lawn conditions and to stabilize the overall device against possibility of overturning while maintaining a high velocity of the cuttings-air-mixture to assure proper ejection of grass as well as scouring of the housing during cutting.

A more specific object is the provision of a rotary mower of the class described wherein the center of gravity of the entire mower structure is materially lowered as contrasted with conventional mowers now in use and which permits use of a much shorter crankshaft on the motor or engine, substantially eliminating crankshaft bending which is now inherent in most conventional mowers.

A further object is the provision of a rotary mower of the class described wherein through combination of a volute inverted channel with an adjustable deflector, protection is afforded against throwing or centrifugal ejection of a small stone or other object while the grass cuttings may be projected and discharged downwardly in most efficient manner.

Another object is the provision of a housing in combination with cutting means to minimize reverberation of sounds and to afford greater strength throughout and protection to the operators and others present.

Another and important object is the provision of structure of the housing and grass-accumulating means which provides for a bagging attachment mounted in the direction of travel of the mower as contrasted with the present bagging means where the bag is mounted at right angles to the direction of travel and which in overall characteristics, permits easier maneuverability of the mower with increased ability of the operator to direct the mower into tighter and small-compass areas.

These and other objects and advantages of our invention will more fully appear from the following description made in connection with the accompanying drawings wherein like reference characters refer to similar parts throughout the several views and in which:

Fig. 1 is a perspective view taken from the right hand side and top of an embodiment of our improved rotary mower;

Fig. 2 is a perspective view on a slightly larger scale taken from the top and forward of said mower with the bagging attachment operatively connected therewith;

Fig. 3 is a top plan view of the mower on a larger scale with the engine and shroud removed;

Fig. 4 is a bottom plan view of the same;

Fig. 5 is a longitudinal cross section taken along the line 5—5 of Fig. 3 looking in the direction of the arrows;

Fig. 6 is a detail cross section taken substantially along the line 6—6 of Fig. 2; and Fig. 7 is a fragmentary side elevation with one of the wheels broken away in part and showing the adjustable mounting of the wheels for varying cutting height.

Referring in detail to the embodiment of the invention illustrated, we provide a rigid and preferably integral metal housing or cowling indicated as an entirety by the letter H, being of a generally rectangular shape with a forward inwardly curved flanged end 7 and a reinforced and flanged rear end 8. The housing H includes a generally circular central portion of strong rigid material comprising an inverted volute or involute channel 9, the upper volute portion of which is disposed in general at a lower level than the reinforced upstanding side and forward and rear portions of the general housing as clearly shown in Fig. 5. The inner side of the inverted volute channel is defined by volute wall 9a which extends upwardly from a central, substantially flat but slightly domed motor supporting plate or web 10. The outer volute wall 9b of the channel is defined by an appropriately curved depending skirt or sides terminating in a lower edge 9c which in the mounting and operation of the mower is preferably disposed a short distance above the ground, usually within a range of from one to two and a half inches and said lower volute edge 9c with the exception of a section thereof 9d at the front end of the housing, lies in a common horizontal plane. The section 9d of the skirt is raised approximately a half inch above the remaining portions of the outer edge of the channel to facilitate cutting of tall stalks and weeds at the front of the mower (see Fig. 4).

The inverted volute channel 9 has its most restricted portion at the rear right hand side of the general housing, ever increasing in cross sectional area from that point to a widely flaring discharge mouth 9m which is disposed at the forward right hand side of the general housing. Said mouth as clearly shown in the drawings because of the involute form directs grass and cuttings generally rearwardly rather than laterally outward from the housing. The slightly domed generally horizontal base plate 10 has a large circular aperture 11 formed therein for receiving depending portions of the motor or engine including hub and blade attachment portions and driving shaft. The particular embodiment illustrated employs as shown in Fig. 3 an upstanding broken annular attachment flange 11a flatted at 11b on the forward portion thereof and having as shown three integrally formed upstanding bosses 11c which are tapped for receiving bolts to secure the motor thereto.

To substantially reinforce the overall housing including the inverted volute channel 9, upstanding longitudinal reinforcing ribs 12 are provided at each longitudinal side of the housing as shown extending the full length thereof and beyond the forward and rear portions of the channel 9. The housing is further reinforced at the forward end by, as shown, an integrally formed box-like structure 13 with upstanding corner portions 13a and a forward depending heavy flange 13b which is spaced a short distance forwardly of the depending skirt 9c of the channel and extends transversely in inwardly curved fashion across the entire front of the housing.

The rear of housing H is provided with a shallow box-like transverse portion 14 terminating in a depending transverse lip 14a which is spaced several inches rearwardly of the rear circumferential portion of the volute channel 9 to additionally reinforce the overall housing and to further provide a guard or safety factor later to be more fully described.

The entire housing with the inverted volute channel and all reinforcements and ribs is preferably integrally formed by casting thereby producing an extremely strong and rigid structure at relatively low cost.

A pair of front wheels W-1 and a pair of rear wheels W-2 are preferably adjustably mounted on the forward and rearward longitudinal side portions of the housing for supporting the housing from the ground with provision for vertical adjustment of the lower edge 9c of the volute channel skirt and consequently adjustment of the height of the "cut" within a desired range. To this end as shown, see Figs. 3 and 7, we provide for each wheel a bell crank type of mounting bracket 15 pivoted snugly against a vertically flatted and slightly enlarged face of the forward and rearward side portions of the housing as by a pivot bolt 16, each bell crank bracket having a lower arm 15a which at its outer end carries a sturdy stub shaft to which appropriate wheel is journaled. The upper arm 15b of each bell crank bracket is provided with an inwardly-spring-urged retaining pin 15c which is selectably engageable with a plurality of adjustment sockets formed in the said flatted reinforced portions of the sides of the housing and arranged on an arc concentric with the pivot bolt 16. The flatted vertical mounting portions of the forward sides of the housing are indicated by the numerals 13c while the corresponding vertical mounting portions at the rear of the housing are indicated by the numeral 14c. The retaining pins 15c have appropriate knobs (not shown) at the outer ends thereof to facilitate withdrawal of the pins for adjustment of the respective wheel mounting.

A motor designated as an entirety by the letter M which may be of conventional internal combustion or, if desired, electrical type is secured upon the top of the motor supporting plate 10 of the housing with the power shaft 17 thereof disposed substantially concentrically through the circular aperture 11 formed in said base plate and extending downwardly only a short distance below the central slightly domed portion of the housing which is encircled by the involute channel 9. The lower portion of the motor shaft 17, as shown, is externally threaded to receive an adjustment clamping collar 18 and said shaft is tapped axially from its lower end to receive the threaded portion of a clamping nut 19, said nut with the clamping collar 18 very rigidly securing a blade and skid shoe unit to be presently described.

As shown said unit comprises an integrally formed, elongated blade bar 20 having a somewhat widened centrally apertured and slightly offset central portion 20a which is clamped between the adjustment collar 18 and the head of clamping nut 19 and which also is confined and locked by notched or recessed portion 21a formed diametrically in the annular upstanding peripheral wall 21b of a generally circular, anti-scalping skid shoe 21 which is rigidly affixed for driving to motor shaft 17 and secured to said shaft also by the clamping action between internally threaded collar 18 and the terminal clamping nut 19. The skid shoe 21, as shown, has a central frusto-conical wall preferably formed integrally with the other portions thereof and indicated at 21c which is closed at its upper end by an apertured integral top 21d lying just below and flush against the clamped central portion of the blade bar. The blade shanks 20b extending outwardly and preferably being upwardly offset from the central attachment portion 20a of the blade bar extend diametrically outward radially of the inverted channel 9 and terminate in inclined cutting blades 22 which have beveled or otherwise sharpened lower cutting edges 22a, revolving in operation within the confines of the outer wall portion 19b of the involute channel and substantially at the level for cutting of the lower edge 9c of the skirt portion of the channel. The laterally inclined trailing edges of the blades 22 with the blade structure produce an updraft fan action causing an upward lifting of the grass and other stalks cut or to be cut. The revolution of the blades 22 just below and in close combinative relation with the involute channel produces a rapid air vortex or swirl in channel 9 which, due to the constantly increasing cross sectional area of the internal channel from the diminished rear and right side of the housing circumferentially first across the housing and then forwardly and again across the forward portion of the housing, provides increasing expansion of the accumulating cuttings and air resulting at the mouth 9m of the channel in a highly efficient discharge of air and the accumulated cuttings in a general rearwardly and outwardly swirling direction.

Another important and novel feature of our invention is the provision of an adjustable deflector and guard closely combined with the discharge mouth of channel 9. As shown we provide a suitably curved deflector plate 23 having an upper edge 23a which is hinged to lugs or hinge elements 24 provided on the casting or housing H at the right longitudinal side thereof rearwardly of the discharge mouth 9m. Deflector plate 23 at its forward portion, is curved in conformance with a continuation of the cross sectional shape of the discharge mouth 9m of the channel and as shown in Fig. 1 in its downwardly adjusted position, forms a continuation of said channel which protrudes for several inches laterally and rearwardly of the orbit of the blade tips at the right hand side of the mower, thereby serving to deflect grass and any centrifugally thrown objects or cuttings downwardly to protect the operator or others positioned at the discharge side of the mower in operation. The permanent hinged attachment of deflector plate 23 prevents its removal, thereby preserving the safety features and it also permits the deflector to be raised as shown in Fig. 2 during extremely heavy cutting to increase the capacity of the mower and to furthermore, as shown in Fig. 2, permit of a cooperating bagging attachment later to be described. Means such as a frictional device or wing nut attachment may be provided for retaining the deflector plate in fully opening or slightly downwardly adjusted positions. The deflector plate 23, while being shown in fully open position in Fig. 6, normally will rest against the wing nut on lug 27 when the plate is not retained in the fully open position.

Closely cooperating when it is desired to collect grass and other cuttings, is a bagging attachment (see Figs. 2 and 6) which includes a receiving tube or conduit 25 flaring slightly from its forward or channel-connection end 25a to its rear or bag connection end 25b and longitudinally curved in general conformance with a continuation of the involute shape of channel 9 from the discharge mouth thereof. This tube may be conveniently constructed of slightly flexible tough plastic material to reduce resonance and noise and to facilitate its interconnection with the discharge mouth of the channel and with the hemmed and contractible forward end 26a of an elongated porous collection bag 26 which it will be noted, extends rearwardly generally in the direction of travel of the mower as distinguished from prior art bagging structures, which generally are cumbersome and resist forward travel.

The forward end 25a of the bag-connection-tube closely interfits the outer contour of the channel discharge mouth 9m and as shown, is provided with an overlying attachment flange 25e (see Fig. 6) which is securely attached to a heavy lug 27 appropriately formed as by casting above the top of the channel at the discharge mouth. The open contractible end 26a of the bag may be shirred as by a draw string 28 for positive connection with an enlarged annular flange 25c supplied by the rear end of the tube 25. The rear closed end of the bag 26 may be suitably supported and elevated from the intermediate portion of the push and guide handle X of the mower through the intermediary of a resilient supporting element such as the horizontal arm 29 having a hook 29a at the outer end thereof for engaging a grommet or loop 26b at the diminished upper and rear end of the bag.

The elongated handle X is of generally conventional structure composed of a pair of side bars or sections 30 having the forward ends thereof 30a preferably hingedly connected with upstanding attachment lugs or the equivalent (not shown) provided by the top and medial portion of the housing. As shown the rear and upwardly extending end of handle X is closed by a bar section 30b and a transverse, rigidly connecting plate 31 is provided interconnected with the sides of the handle upon which throttle control and if desired, clutch control means may be mounted for the motor.

The engine or motor M is preferably covered with a shroud S of tough plastic material which in addition to increasing the ornate appearance of the mower, serves functionally to keep the engine cleaner and it also serves to reduce engine noise.

From the drawings it will be noted that all structural surfaces of the preferably integral housing and all corners are curved for greater strength and to reduce the tendency for the housing to reverberate sounds produced by the engine and blades.

From the drawings and detailed description, it will be noted that the overall mower including the motor mounted thereon, has a much lower silhouette than any of the prior art structures with an unusually low center of gravity approximately only from 5 to 6 inches above the supporting ground line. Such lower silhouette and center of gravity brought about through the combination of the inverted involute channel with the motor base disposed centrally and below the top of the channel, gives our mower a greater stability on slopes and substantially eliminates the tendency of the mower to overturn when starting and in addition, permits the important use of a very short crankshaft on the engine which materially reduces crankshaft bending.

The rigid housing structure is extended both at rear and front of the mower beyond the cutting area of the blades and in fact, is double-walled at each end of the mower to very efficiently protect the operator and bystanders. The double rear wall is particularly effective for protection of the operator's feet in backward pulling of the motor or in the event the operator should slip or fall.

The hinged deflector 23 in its lowered slightly declined position, efficiently forms a continuation of the upper contour of the involute discharge mouth of the housing while substantially preventing dangerous throwing or discharge of stones or small obstacles.

The directional revolution of the cutting blades in combination with the inverted involute channel produces a most effective pickup and very rapid discharge of all cuttings, the speed of the swirling air and cuttings through the channel being sufficiently high to effectively scour the channel and prevent accumulation or encrustation on the interior thereof. The constantly increasing cross sectional area of channel 9 accommodates the increasing discharge volume of air and grass pulled therein to produce proper cutting and instant dispersing of the cuttings from very thick lawns and where growth of relatively tough stalks is present.

The operation of the anti-scalping skid shoe and its relationship to the cutting blades 22 is of importance, when the mower is driven over lawns which have undulating and irregular or recessed surfaces. The annular lower edge of the shoe 21 normally is spaced one fourth inch or more above level ground but will engage the ground when sharp inclinations, depressions or undulations are present, thereby skidding with the assistance of two or more of the wheels to however always maintain the level of the cutting edges of the blades above ground, thus very substantially minimizing scalping.

It will be noted from Figs. 2 and 4 that the involute channel spirals to an extent of almost a complete revolution which measured in degrees of a circle substantially exceeds 260 degrees and in fact, substantially exceeds in the form shown 290 degrees.

From the foregoing description it will be seen that we have provided a simple, rugged and highly efficient power rotary mower having greater capacity, stability and faster discharge than rotary mowers of the prior art, and in addition, offering substantially improved safety to the operator or to bystanders, during cutting.

It will of course be understood that various changes may be made in the form, details, arrangement and proportions of the parts without departing from the scope of our invention.

What is claimed is:

1. A lawn mower of the rotary cutter type having a cowling including a top and depending sides, said sides having a lateral discharge opening, a hollow conduit operatively associated with said cowling and having a forward end registering with said discharge opening and a rearward end, an elongate bag having a mouth at one end disposed around the rearward end of said conduit, and a support between said mower and the rear portion of said bag.

2. A lawn mower of the rotary cutting type as claimed in claim 1 additionally including forward and rear wheels for supporting said cowling for travel over the ground, said conduit terminating forward of a transverse line extending through the rear wheels of said mower.

3. A lawn mower of the rotary cutting type as claimed in claim 1, wherein said cowling includes an inverted channel circumferentially traversing the interior front portion of the cowling and in communication with said discharge opening, so as to define a generally transverse clipping receiving and discharging chamber.

4. A lawn mower of the rotary type as claimed in claim 1 wherein said cowling is shaped to define an inverted generally arcuate channel being effective to direct the clippings through said opening and minimize recirculation thereof.

5. A lawn mower of the rotary cutting type as claimed in claim 4 wherein said channel is in the form of a volute of ever increasing cross sectional area, the enlarged end thereof terminating in said opening.

6. A lawn mower of the rotary cutting type as claimed in claim 5 said channel starting at its diminished end at the rear and adjacent one side of said cowling and partially encircling said cowling below the top thereof and extending through an arc greater than 260 degrees.

7. A lawn mower of the rotary cutting type as claimed in claim 6 further characterized by an adjustable deflector plate shiftably mounted at its upper edge upon the discharge side portion of said cowling at the top of said discharge opening and curved transversely to conform when disposed horizontally to the contour of the top of said channel, said deflector plate in elevated position accommodating and permitting attachment and operative association of said hollow conduit with said discharge opening.

8. A lawn mower of the rotary cutting type as claimed in claim 1 additionally including an upstanding handle attached to said mower and extending rearward therefrom, said support including said handle and a supporting member connected thereto.

9. A lawn mower of the rotary cutting type as claimed in claim 8 additionally including forward and rear wheels for supporting said cowling for travel over the ground, and wherein said conduit terminates forwardly of a transverse line extending through said rear wheels, said bag, when connected between the conduit and said supporting member, being positioned substantially parallel to said handle so as to extend rearwardly along a major portion thereof.

10. A lawn mower of the rotary cutting type as claimed in claim 8 wherein said bag is formed of air previous material, and when connected between said conduit and said supporting member, is positioned substantially parallel to said handle so as to extend rearwardly along a major portion thereof.

11. A lawn mower of the rotary cutter type as claimed in claim 10 wherein said cowling is shaped to define an inverted generally arcuate channel partially encircling said cowling below the top thereof, said channel being effective to direct the clippings through said discharge opening and conduit with sufficient force to carry them into said bag.

12. A lawn mower of the rotary cutting type defined in claim 1, additionally including forward and rear wheels for supporting said cowling for travel over the ground, an upstanding handle attached to the mower at the rear portion thereof and extending rearwardly of the rear wheels, said support extending laterally outwardly from the mower and spaced considerably rearwardly of the rear wheels of the mower, the lengthwise dimensions of the bag being such that when said one end is attached to the conduit and the rear portion is supported by said support it is substantially parallel with a considerable portion lengthwise of the handle but in outwardly laterally spaced relationship with the handle, and the bag support also serving to maintain the bag in its substantially parallel relationship with the handle.

References Cited in the file of this patent

UNITED STATES PATENTS

| | | |
|---|---|---|
| 2,071,872 | Cockburn | Feb. 23, 1937 |
| 2,547,328 | Koch et al. | Apr. 3, 1951 |
| 2,549,317 | Laughlin | Apr. 17, 1951 |
| 2,658,318 | Miller | Nov. 10, 1953 |
| 2,708,334 | Coners | May 17, 1955 |
| 2,719,396 | Morris et al. | Oct. 4, 1955 |
| 2,720,070 | Arrington | Oct. 11, 1955 |
| 2,756,556 | Watkins | July 31, 1956 |
| 2,760,327 | Bovee | Aug. 28, 1956 |
| 2,801,513 | Olson | Aug. 6, 1957 |
| 2,807,126 | Bennett | Sept. 24, 1957 |
| 2,931,157 | Smith et al. | Apr. 5, 1960 |

UNITED STATES PATENT OFFICE
CERTIFICATION OF CORRECTION

Patent No. 2,973,614                 March 7, 1961

Herbert F. Horner et al.

It is hereby certified that error appears in the above numbered patent requiring correction and that the said Letters Patent should read as corrected below.

Column 7, line 22, for "previous" read -- pervious --.

Signed and sealed this 25th day of July 1961.

(SEAL)
Attest:

ERNEST W. SWIDER                 DAVID L. LADD
Attesting Officer                  Commissioner of Patents